United States Patent
Spencer

(10) Patent No.: US 6,381,322 B1
(45) Date of Patent: Apr. 30, 2002

(54) SYSTEM FOR PROCESSING INCOMING CALLS BASED ON CALL PRIORITY FOR TELEPHONE STATIONS HAVING MULTIPLE LINES

(75) Inventor: Sharlene J. Spencer, Aurora, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/410,886

(22) Filed: Oct. 4, 1999

(51) Int. Cl.[7] .................................................. H04M 3/20
(52) U.S. Cl. ................................... 379/208.01; 379/161
(58) Field of Search .............................. 379/156, 157, 379/161, 177, 187, 208.01

(56) References Cited

U.S. PATENT DOCUMENTS

| | | | | |
|---|---|---|---|---|
| 3,701,853 A | * | 10/1972 | Duval et al. | 379/208.01 |
| 3,917,910 A | * | 11/1975 | Nielson | 379/205.01 |
| 4,096,358 A | * | 6/1978 | Bidlack et al. | 379/159 |
| 4,109,113 A | * | 8/1978 | Allison et al. | 379/161 |
| 5,034,975 A | * | 7/1991 | Grimes | 379/142.08 |

* cited by examiner

Primary Examiner—Harry S. Hong
(74) Attorney, Agent, or Firm—Patton Boggs LLP

(57) ABSTRACT

A system for providing call precedence for incoming telephone calls received by a switching system for a telephone station that has a plurality of lines connected to said telephone station. The system of this invention receives an incoming telephone call having a first priority level for the telephone station. The system of this invention then determines whether the telephone station has an available line. If the telephone station does not have an available line, it is determined whether the telephone station has an active call connected to the telephone station. If an active call is connected the telephone station, a signal is transmitted indicating a priority incoming call responsive to a determination that said telephone station has an active call. The system then wait to receive a response from the telephone station. If a response is received, a connection of the incoming call to the telephone station is established.

24 Claims, 3 Drawing Sheets

200

200

SYSTEM FOR PROCESSING INCOMING CALLS BASED ON CALL PRIORITY FOR TELEPHONE STATIONS HAVING MULTIPLE LINES

FIELD OF THE INVENTION

This invention relates to a telephone switching system that provides call management based upon call priority. More particularly, this invention relates to a telephone switching system that provides call priority to a telephone station having more than one line of service from the switching system.

PROBLEM

Some institutions, such as the military, require telephone service having call priority. In a call priority system, incoming telephone calls to a telephone station are processed in the following manner. For purposes of the present discussion, a telephone station is a telephone set, computer, fax machine, or other piece of telephonic equipment that is a termination point for telephone calls in a system. If the telephone station is not connected to an existing call, the incoming call is processed normally and connected to the telephone station. If the telephone station is already connected to existing call, the following method is used to process the call. First, the priority of the incoming call is determined. If the incoming call has a greater priority than a routine call, a signal is transmitted to the telephone set that indicates a priority call is waiting to connect. The signal is a distinctive beep or other sound transmitted over the voice channels of a telephone set to notify a user of an incoming call with priority. If the incoming call does not have a priority higher than a routine call, a busy signal is returned to the calling party.

In today's society, it is common for a switching system, such a Personal Branch eXchange (PBX) switch to provide a telephone station with more than one line. For example, a telephone set in each office of a building may have two lines connected to the set. A user may then be actively connected to a call over one line while another call on another line is in an on-hold status. The user may also change the status of a call on a line from active to on-hold. The changes are usually made by pushing a button which sends an out of band signal to the telephone switching system signaling the desired change.

It is a problem to provide a priority call system to a telephone station having more than one connected line. One problem that arises in providing a call priority system to telephone stations having more than one line is a determination of which line has an active call. A second problem is how to a handle a call that has a higher priority level than an active call over the telephone network. There is a need in the art for a system that can solve the above problems.

SOLUTION

The above described problems are solved and a technical advance achieved by a system for processing telephone call with call priority for telephone stations having multiple lines. The system of the present invention is provided by applications executed by a switching system that provides telephone service to a telephone station. The following process is executed by the switching system to provide call priority to a telephone station. One advantage of this invention is that the processes described can be performed for an analog telephone set, a digital telephone set, and/or a BRI telephone set.

When an incoming call for an extension of a telephone station connected to a switching is received by the switching system, the switching system determines whether all of the lines available to the telephone station already have a connected call appearing on the line. If there is a line available to the telephone station, the call is connected to the available line and the user is signaled that a new call has been received. If there are no available lines for the telephone station, it is determined whether there is an active call currently connected to the station. If there is not an active telephone call connected to the telephone station, the switching systems returns a busy signal to indicate the telephone station cannot currently accept the call. If the call is an incoming call received over the telephone network the priority of each existing call is compared to the priority of the incoming call. If an existing on hold telephone call has a lower priority level than the incoming call, the existing call with a lower priority is disconnected and the incoming call is then connected over that line.

If all of the available lines are connected to calls and one call is actively connected to the station, the following process is executed when an incoming call has a priority greater than a routine call. The priority level of the incoming call is compared to a priority level of active call. If the priority level of the incoming call is greater than the priority level of the active call, a signal, such as a distinctive tone, is transmitted to the user over voice channels to indicate a priority call. Otherwise, busy signal is returned.

In an alternative embodiment, the following process occurs when a priority call has priority that is less than the active call. If the priority level of the incoming call is less than the priority level of the active call, the priority level of the incoming call is then compared to the priority level of the on-hold calls on the other lines. If a call having a lower priority level than the incoming call is found, the call is disconnected and the incoming call is connected to the line that was handling the disconnected call. The incoming call is then placed in an on-hold status.

DETAILED DESCRIPTION

Figure 1:
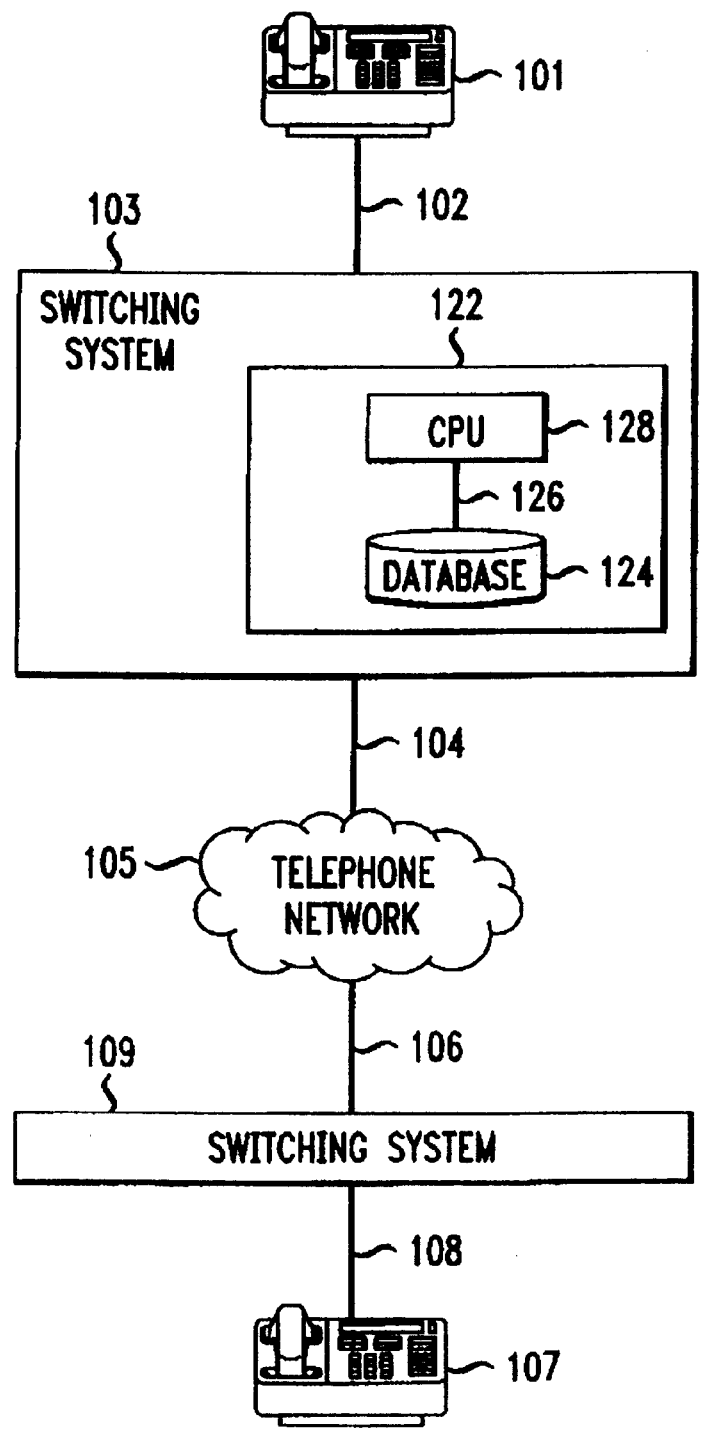
FIG. 1 illustrates in block diagram form the overall architecture of a typical telephone switching system in which priority based call waiting system is operational.

FIG. 1 illustrates the overall architecture of a typical telephone system 100 in block diagram form. Telephone system 100 includes a switching system 103 in which the present call waiting system is operational. In telephone system 100, there is at least one telephone set 101 connected to a switching system 103 via a telephone line 102. Switching system 103 is connected to a telephone network 105 via telecommunications path 104 which includes trunks connecting switching system 103 to other switching systems in network 105. A calling party has a calling party telephone set 107 connected to a second switching system 109 via telephone line 108. Switching system 103 is in turn connected to telephone network 105 via communications path 106.

Subscriber telephone station 101 is a device used for telecommunications such as a commonly available telephone set, facsimile machine, or computer. Switching system 103 is a well known switching system, such as a Definity G3 switching system manufactured by Lucent Technologies of Holmdel, New Jersey. A switch controller 122 controls the operation of switching system 103. Processor 123 inside controller 122 is a processing system which executes instructions stored in a connected memory to perform the functions of switch controller 122. A memory 124 is connected to processor 123 via bus 126 and stores data for use in the operation of switching system 103. It should be apparent to those skilled in the art that the process performed in accordance with this invention can be used by any type of processing unit that routes calls whether the processing unit is internal to the switching system or external to the switching system 103.

In a switching system 103 that provides priority based calling, each call has a priority level. As the priority level of a call increases, the importance of the call increases and the call must be handled. In a preferred exemplary embodiment, the priority levels in a calling system include the following priority levels in order of importance: flash override, flash, immediate, priority and routine. Incoming calls have a default routine priority level in the preferred embodiment.

Figure 2:
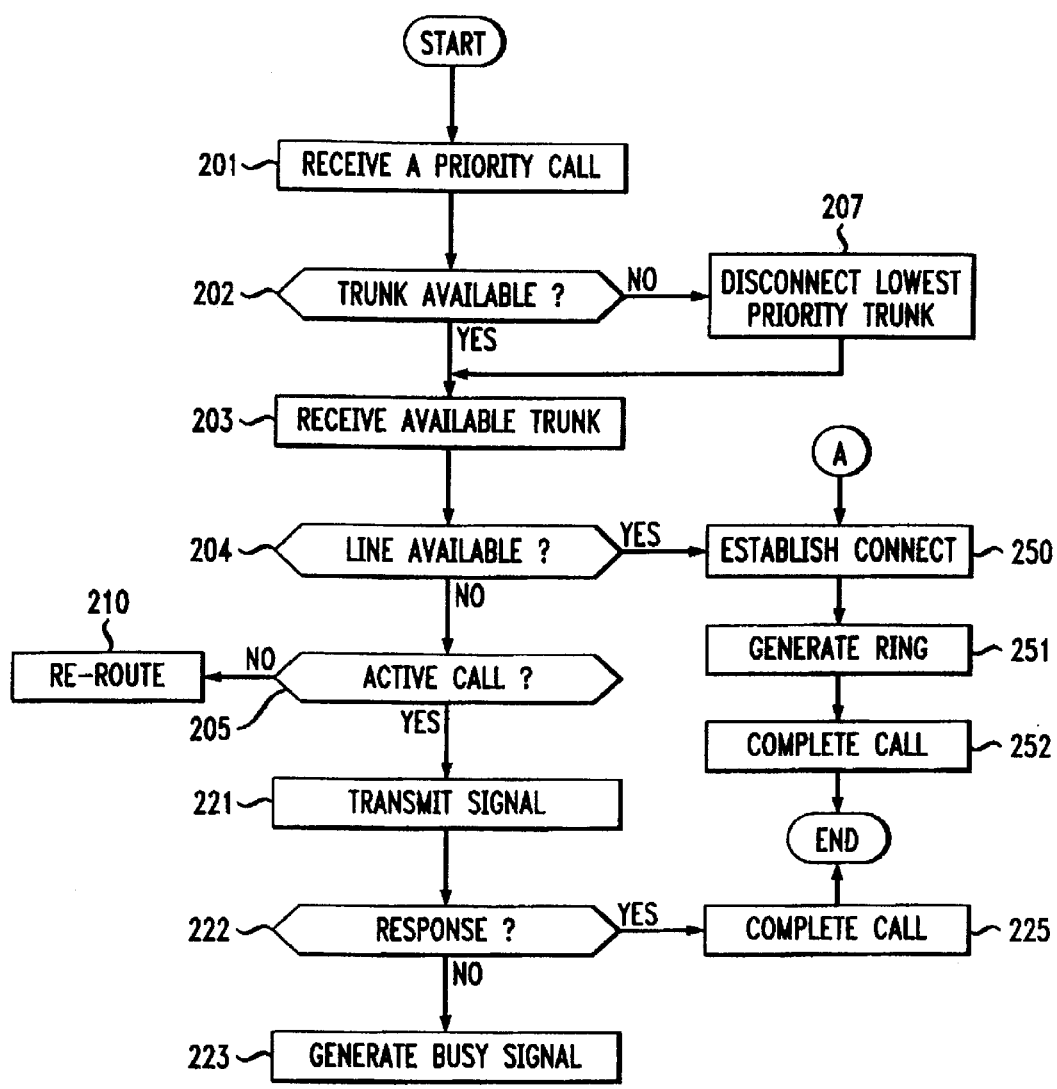
FIG. 2 illustrates in flow diagram form, an exemplary embodiment of operational steps taken by the present priority based call waiting system.

FIG. 2 illustrates the operational steps of a process 200 executed by switching system 103 to provide a priority call system to a telephone station 101 having multiple lines connected to the telephone station 101. One skilled in the art will recognize that it is possible to combine steps in this process to use other equivalent steps to perform functions the steps in process 200.

Process 200 begins in step 201 by receiving an incoming call for a telephone station 105 connected to switching system 100. In step 202, switching system 103 determines whether switching system 103 has a trunk available to receive a telephone call. If it is determined that there is not an available trunk, a trunk servicing the lowest priority call is disconnected in step 207. The call is the connected over the free trunk in step 203 if a trunk is available in step 202 or after the trunk servicing the lowest priority call is disconnected in step 207.

After the call is connected to an available trunk in step 203, the switching system determines whether the called extension has a line available to receive the call in step 204. If there is no line available in step 204, the switching system determines whether there is an active line currently connected to the called extension in step 207.

If there is a line available to the called extension, a connection is established in a conventional manner in step 250. A ring is generated to the calling party in step 251 and the call is completed in a conventional manner in step 252.

If there is no line actively connected to the called extension, there are do different embodiments. In the preferred embodiment of FIG. 2, the call is re-routed to another extension in step 210 if there is not an active line in step 207. In an alternative embodiment illustrated in FIG. 3, the priority of calls on the lines connected to the extension are determined in step 310. The call with the lowest priority is disconnected from the line to create an available line in step 311. A conventional call is then established over the available line in step 312

Figure 3:
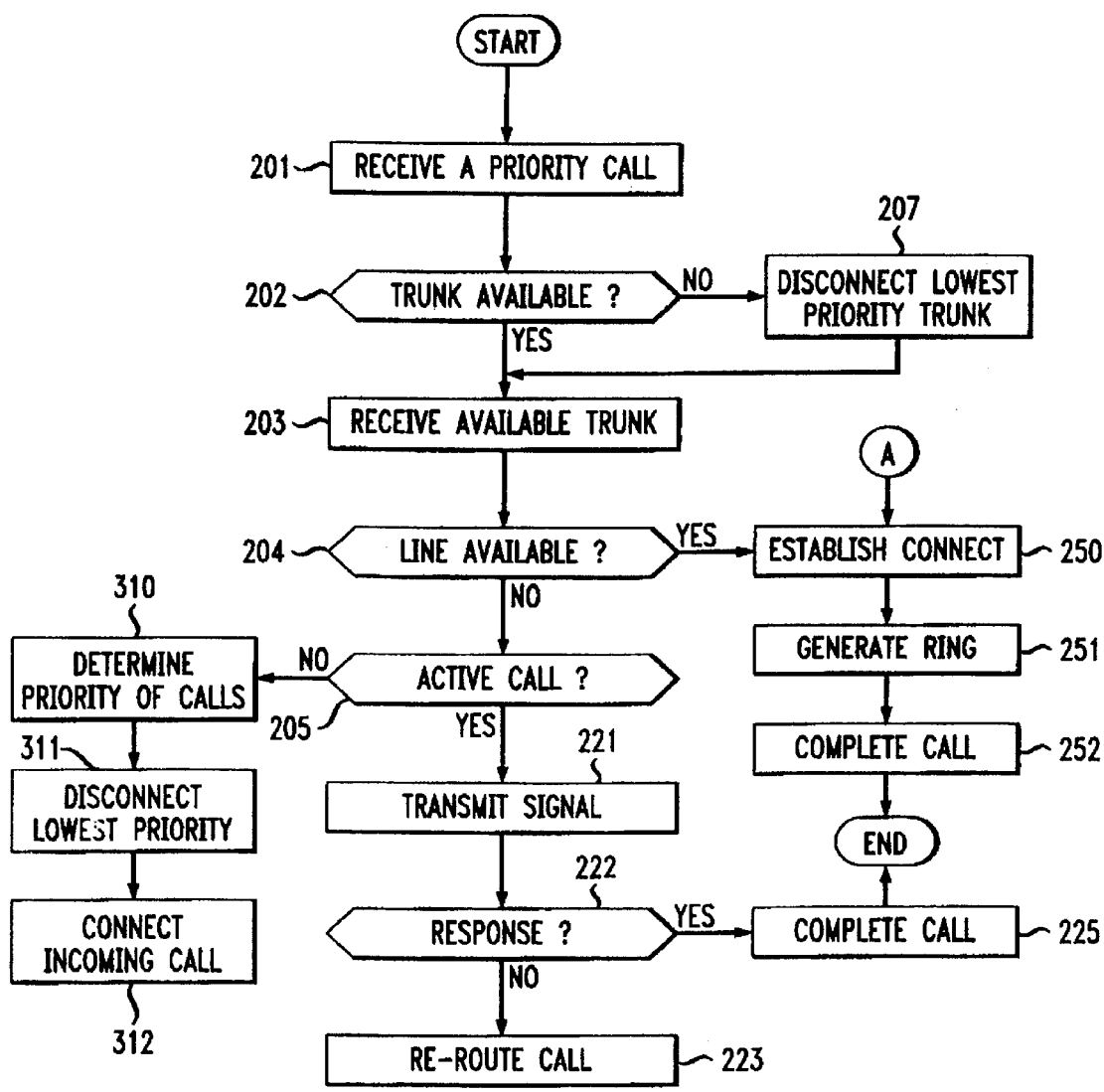
FIG. 3 illustrates in flow diagram form, alternative embodiment of operational steps taken by the present priority based call waiting system.

If there is a line available in step 207 or after step 311. The call is connected to the available line in step 220. A signal, such as a tone, is then provided to the user in step 221. The tone may be a distinctive tone played in band for a user to hear. It is then determined if a response is received in step 222. If a response is not received, a busy is returned in step 223. Alternatively as shown in FIG. 3, the priority call may be rerouted to another extension in step 323. If a response is received in step 222, the call is completed in a conventional manner for call waiting in step 225.

The above is a description of a system that provides a priority call system to a telephone set serviced by more than one line. It is expected that those skilled in the art can and will design alternative system that infringe on this system as set forth in the claim below either literally or through the Doctrine of Equivalents.

What is claimed is:

1. A method for providing call precedence for incoming telephone calls received by a switching system for a telephone station that has a plurality of lines connected to said telephone station, said method comprising the steps of:

receiving an incoming telephone call having a first priority level for said telephone station;

determining whether said telephone station has an available line;

determining whether said telephone station has an active call responsive to a determination that said telephone station has no available line;

transmitting a signal indicating a priority incoming call responsive to a determination that said telephone station has an active call;

determining whether a response to said signal is received; and establishing a connection for said priority call responsive to a determination that a response is received.

2. The method of claim 1 further comprising the steps of:
   generating a busy signal in response to a determination that said response is not received.

3. The method of claim 1 further comprising the step of:
   re-routing said incoming priority call to a second telephone station in response to a determination that said response has not been received.

4. The method of claim 1 further comprising the step of:
   re-routing said incoming call to a second telephone station in response to a determination that there is not an active call connected to said telephone station.

5. The method of claim 1 further comprising the step of:
   returning a busy signal in response to a determination that there is not an active call connected to said telephone station.

6. The method of claim 1 further comprising the steps:
   establishing a connection of said incoming call to an available line responsive to a determination that there is an available line connected to said telephone station;
   generating a ring to said calling party in response to an establishment of said connection; and
   completing said incoming call in response to generating said ring.

7. The method of claim 1 further comprising the steps of:
   determining whether a trunk is available for said incoming priority call responsive to receiving said incoming priority call; and
   disconnecting a trunk carrying a lowest priority call in response to determining that there are no trunks available.

8. The method of claim 7 further comprising the step of:
   reserving an available trunk for use in connecting said incoming priority call.

9. A product for call precedence for incoming telephone calls received by a switching system for a telephone station that has a plurality of lines connected to said telephone station, said product comprising:
  instructions for directing a processor associated with said switching system to:
    receive an incoming telephone call having a first priority level for said telephone station,
    determine whether said telephone station has an available line,
    determine whether said telephone station has an active call responsive to a determination that said telephone station has no available line,
    transmit a signal to said telephone station indicating a priority incoming call responsive to a determination that said telephone station has an active call,
    determine whether a response to said signal is received from said telephone station, and
    establish a connection for said priority call responsive to a determination that a response is received;
  a media readable by said processing unit for storing said instructions.

10. The product of claim 9 wherein said instructions comprise:
  instructions to direct said processing unit to generate a busy signal in response to a determination that said response is not received.

11. The product of claim 9 wherein said instructions comprise:
  instructions for directing said processing unit to re-route said incoming priority call to a second telephone station in response to a determination that said response has not been received.

12. The product of claim 9 wherein said instructions comprise:
  instructions for directing said processing unit to re-route said incoming call to a second telephone station in response to a determination that there is not an active call connected to said telephone station.

13. The product of claim 9 wherein said instructions comprise:
  instructions for directing said processing unit to return a busy signal in response to a determination that there is not an active call connected to said telephone station.

14. The product of claim 9 wherein said instructions comprise:
  instructions for directing said processing unit to:
    establish a connection of said incoming call to an available line responsive to a determination that there is an available line connected to said telephone station;
    generate a ring to said calling party in response to an establishment of said connection; and
    complete said incoming call in response to generating said ring.

15. The product of claim 9 wherein said instructions comprise:
  instructions for directing said processor to:
    determine whether a trunk is available for said incoming priority call responsive to receiving said incoming priority call; and
    disconnect a trunk carrying a lowest priority call in response to a determination that there are no trunks available.

16. The product of claim 15 wherein said instructions comprise:
  instructions for directing said processing unit to reserve an available trunk for use in connecting said incoming priority call.

17. An apparatus for providing call precedence for incoming telephone calls received by a switching system for a telephone station that has a plurality of lines connected to said telephone station, said apparatus comprising:
  means for receiving an incoming telephone call having a first priority level for said telephone station;
  means for determining whether said telephone station has an available line;
  means for determining whether said telephone station has an active call responsive to a determination that said telephone station has no available line;
  means for transmitting a signal indicating a priority incoming call responsive to a determination that said telephone station has an active call;
  means for determining whether a response to said signal is received; and
  means for establishing a connection for said priority call responsive to a determination that a response is received.

18. The apparatus of claim 17 further comprising:
  means for generating a busy signal in response to a determination that said response is not received.

19. The apparatus of claim 17 further comprising:
  means for re-routing said incoming priority call to a second telephone station in response to a determination that said response has not been received.

20. The apparatus of claim 17 further comprising:
  means for re-routing said incoming call to a second telephone station in response to a determination that there is not an active call connected to said telephone station.

21. The apparatus of claim 17 further comprising:
  means for returning a busy signal in response to a determination that there is not an active call connected to said telephone station.

22. The apparatus of claim 17 further comprising:
  means for establishing a connection of said incoming call to an available line responsive to a determination that there is an available line connected to said telephone station;
  means for generating a ring to said calling party in response to an establishment of said connection; and
  means for completing said incoming call in response to generating said ring.

23. The apparatus of claim 17 further comprising:
  means for determining whether a trunk is available for said incoming priority call responsive to receiving said incoming priority call; and
  means for disconnecting a trunk carrying a lowest priority call in response to determining that there are no trunks available.

24. The apparatus of claim 23 further comprising:
  means for reserving an available trunk for use in connecting said incoming priority call.

* * * * *